United States Patent [19]
Colby et al.

[11] 3,940,844
[45] Mar. 2, 1976

[54] METHOD OF INSTALLING AN INSULATING SLEEVE ON A STAPLE

[75] Inventors: Harold S. Colby, Bloomfield, Conn.; Raymond H. Landry, South Ashburnham, Mass.

[73] Assignee: PCI Group, Inc., New Bedford, Mass.

[22] Filed: Apr. 4, 1974

[21] Appl. No.: 457,777

Related U.S. Application Data

[60] Continuation of Ser. No. 342,852, March 19, 1973, abandoned, which is a division of Ser. No. 227,842, Feb. 22, 1972, Pat. No. 3,787,608.

[52] U.S. Cl. .......................... 29/450; 29/235; 59/77
[51] Int. Cl.² ......................................... B23P 11/02
[58] Field of Search ............. 29/450, 433, 235, 631, 29/592, 2.25; 85/49; 59/77 X, 71; 174/159, 77 R

[56] References Cited
UNITED STATES PATENTS

| | | | |
|---|---|---|---|
| 420,635 | 2/1890 | Stieringer............................ | 174/159 |
| 843,916 | 2/1907 | Taylor et al. ....................... | 174/159 |
| 2,037,727 | 4/1936 | LaChapelle............................ | 85/49 |
| 2,291,148 | 7/1942 | Carson........................ | 174/159 UX |
| 2,526,902 | 10/1950 | Rublee.............................. | 85/49 X |
| 3,032,769 | 5/1962 | Palmer........................ | 174/159 UX |
| 3,085,129 | 4/1963 | Anderson............................. | 174/159 |
| 3,154,999 | 11/1964 | Stewart........................... | 174/159 X |
| 3,176,945 | 4/1965 | Anderson........................ | 174/159 X |

FOREIGN PATENTS OR APPLICATIONS 708,320   5/1954   United Kingdom............... 174/77 R

*Primary Examiner*—Charlie T. Moon
*Attorney, Agent, or Firm*—McCormick, Paulding & Huber

[57] ABSTRACT

An insulated staple is formed by a U-shaped body member, and a piece of flexible, plastic tubing bent in a U-shaped configuration and installed on the body member. The plastic tubing is cut along a longitudinal wall portion to form a longitudinally extending opening at the central region of the tubing. The insulated staple is then assembled by inserting the opposed and parallel legs of the body member through the longitudinal opening and out through the axial ends of the tubing so that the body member is lined along its inner periphery between the end portions of the tubing mounted on the opposed and parallel legs. The method for making the insulated staple comprises cutting the longitudinal opening in the tube, bending the tube in a U-shaped configuration and inserting the legs of the body member through the axial ends of the tubing so that the pointed tips are exposed and the inner periphery of the staple is lined between the end portions of the tubing on the parallel legs.

16 Claims, 8 Drawing Figures

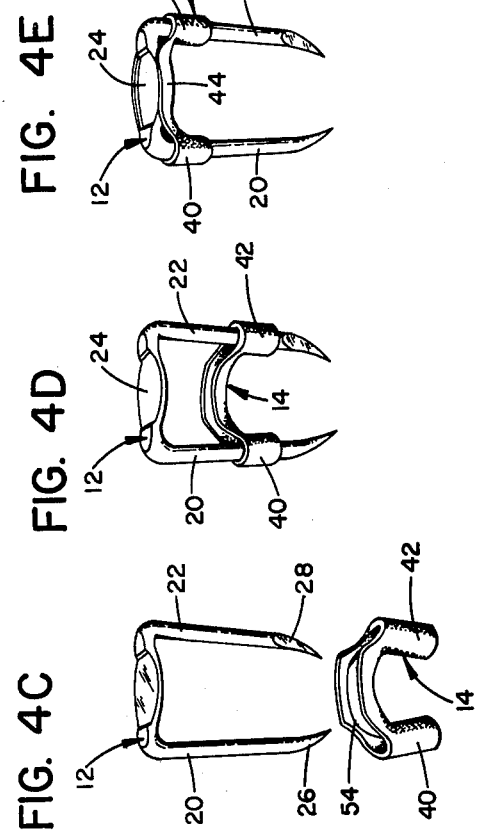

METHOD OF INSTALLING AN INSULATING SLEEVE ON A STAPLE

CROSS REFERENCES TO RELATED APPLICATIONS

This application is a continuation of co-pending application Ser. No. 342,852, filed March 19, 1973, now abandoned, which in turn is a divisional application of Ser. No. 227,842, filed Feb. 22, 1972, now U.S. Pat. No. 3,787,608.

This application also contains subject matter which is related to that in U.S. Pat. No. 3,751,902 entitled "Apparatus for Installing Insulation on a Staple" and having the same assignee.

BACKGROUND OF THE INVENTION

The present invention relates to an insulated staple and the method for making such a staple. More particularly, the present invention is related to a staple which has a generally U-shaped configuration and which includes a section of tubing formed from an insulating material and mounted on a body member to provide a staple with insulating characteristics for supporting conduits on walls, beams and similar supporting objects.

U-shaped staples for mounting conduits such as electrical or fluid conduits to other objects are well known in the are as indicated by U.S. Pats. Nos. 662,587, 2,351,608 and 2,526,902. In a typical installation where such staples are employed, the elongated conductor is held in place by the component parts of the staple comprising a bridging section interconnecting two generally opposed and parallel legs straddling the conductor. The parallel legs have pointed, free ends which are driven into the supporting object by a hammer or other tool. The bridging section of the U-shaped staple is frequently lined or covered with an insulating material so that the conduit or cable being supported is held in isolated relationship from the staple In this respect, the use of the terms "insulated," "insulating" or "insulation" in this specification is intended to encompass electrical, thermal, and vibrational insulating characteristics, all of which can be advantageously employed between mounting staples and a supported conduit.

In the prior art staples exemplified in the above-referenced patents, the U-shaped body member is formed from a relatively hard material, most commonly a metal, in order to withstand the blows of a hammer as the staple is driven into a supporting base. Since most metals are good electrical and thermal conductors and, by their inherent hardness, tend to transmit vibratory forces with little attenuation to the supported conduit, it is common to provide insulation about the bridging section and contiguous portions of the parallel legs of the body member by coating or mounting an insulating material on the body member to separate the conduit and body member in the mounted positions. In U.S. Pats. Nos. 662,587 and 2,351,608 the insulator is formed from a strip of insulating material or less pliable insert and is held to the body member by frictional engagement of the legs. In U.S. Pat. No. 2,526,902, the insulating material is applied to the staple as a close-fitting covering preferably applied by a molding operation with a special molding die of suitable construction.

In each of the above-referenced prior art staples, the insulator is specially formed for mounting on the U-shaped body members. While the end products are suitable for their intended purposes, the use of specially constructed insulators contributes to the cost of the product, and installation procedures utilized with such insulators can become relatively sophisticated in view of special molding or forming techniques required to obtain the desired insulator configuration and other difficulties associated with the installation of the insulators on the body members.

It is accordingly the general object of the present invention to disclose a staple which is simple in construction and which can be easily assembled from readily available insulating material having a multitude of other purposes.

SUMMARY OF THE INVENTION

The present invention resides in a staple and the method by which the staple is constructed. The staple itself is comprised of a U-shaped body member having two opposed and parallel legs which are connected by a bridge section at adjacent leg ends and which are provided with pointed tips at the opposite or free ends for penetration into a supporting object. A section of non-metallic, flexible tubing bent in a U-shaped configuration is fitted over the U-shaped body member with opposite end portions of the tubing being positiond coaxially on the respective, opposed legs of the body member. The tubing section exposes the pointed ends of the legs and has an intermediate portion extending along the bridge section to line at least the inner periphery of the body member between the end portions mounted on opposed legs. The staple is constructed by removing a longitudinal wall portion from a section of flexible tubing and bending the tubing so that the tips of the parallel legs on the body member can be inserted respectively through the opposite axial ends of the tubing. The insulating tubing section and the body member are held together by the frictional engagement of the tubing section and the parallel legs of the body member. The insulated staple is, therefore, easily formed from materials which are readily available and the installation procedure is relatively simple compared to the special forming operations of the prior art.

BRIEF DESCRIPTION OF THE DRAWINGS

FIGS. 4a–4e are a series of views showing the steps by which the flexible insulating tubing is installed on the body member of the staple.

DESCRIPTION OF THE PREFERRED EMBODIMENT

Figure 1:
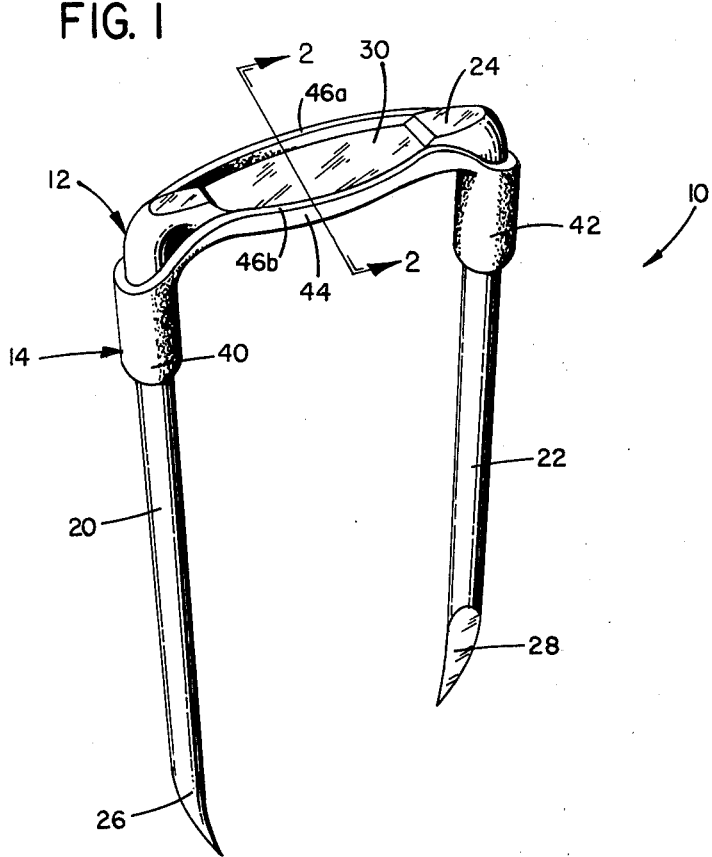
FIG. 1 is a perspective view of the insulated staple of the present invention in one embodiment.
Figure 2:
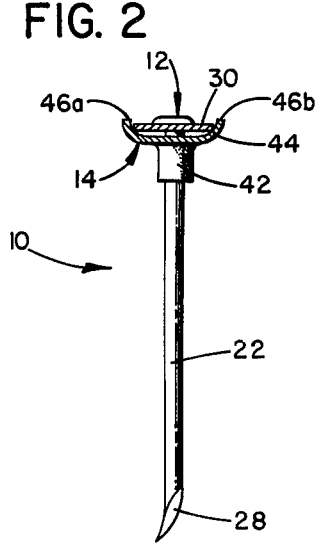
FIG. 2 is a cross sectional view of the insulated staple in FIG. 1 as viewed along the sectioning line 2—2.

FIGS. 1 and 2 shows one embodiment of the insulated staple of the present invention. The staple, generally designated 10, is composed of two basic elements, a U-shaped body member 12 and an insulator which takes the form of a non-metallic, flexible tubing section or sleeve 14 bent in a U-shaped configuration corresponding to the configuration of the body member 12.

The U-shaped body member 12 is a conventional non-insulated staple already known in the prior art and formed from a heavy gauge wire stock of a conductive metal such as a steel alloy. The formation of a U- shaped body member of this type is not new in the art and is well known, one such forming operation and associated apparatus being described in the above-referenced U.S. Pat. No. 2,351,608, so that a further description of the metal forming operation is not provided or considered necessary with respect to the present invention.

As is shown in FIG. 1, the body member 12 is comprised principally of two opposed and parallel legs 20 and 22, each of which is pointed at the free ends 26 and 28 respectively and a bridge section 24 integrally joined with and interconnecting the ends of the legs 20 and 22 opposite the pointed ends 26 and 28. It will be noted that the pointed ends 26 and 28 or tips of the legs 20 and 22 have point-forming shear planes facing in opposite transverse directions relative to the plane of the U-shaped body member 12. As a consequence, the free ends 26 and 28 of the staple legs are aligned in a direction which is slightly out of the plane of the body member 12.

The bridge section 24 integrally connected between the parallel legs 20 and 22 includes a depressed flat or saddle 30 at its center portion which permits only the portions of the body member at the upper ends of the legs and outer ends of the bridge section to be exposed to the driving blows of a hammer that urge the pointed ends 26 and 28 of the legs into a support or base to which a conduit or other object is to be fastened by the staple 10. With such construction, the driving blows are transmitted directly through the parallel legs to the pointed tips and facilitate anchoring the staple to a support.

The insulating tubing section 14 is cut to have a longitudinal length less than the total length of the two parallel legs 20 and 22 and the bridge section 24 of the body member 12, but greater than the length of the bridge section 24 alone so that when the tubing section is centrally mounted on the body member, the free or projecting ends 26 and 28 of the legs 20 and 22 are fully exposed for penetration into a support and the upper portion of the staple 10 is fully lined along the inner periphery which contacts the supported conduit. The tubing 14 is formed from a flexible insulating material, preferably a plastic such as polyvinylchloride or polyethylene, and has an internal diameter corresponding approximately to the outside diameter of the heavy gauge wire forming the body member 12 to receive the legs 20 and 22 in close fitting contact. Although the tubing and the body member are illustrated as having circular cross sections throughout the drawings, it is readily apparent that both tubes and body members having rectangular, oval and other cross sections can be employed. It is desirable, however, that the tubing and the legs of the staple be held in frictional engagement when the tubing is installed so that the insulator stays fastened to the body member before the staple is mounted in a support with a conduit under the bridge section 24.

Figure 3:
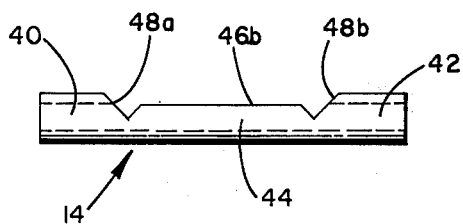
FIG. 3 is a side view of the flexible insulating tubing after a longitudinal wall portion is removed.

As shown by a comparison of FIGS. 1 and 3 the insulating tubing 14 prior to installation on the body member 12 is a straight section of tubing having two axially opposite end portions 40 and 42 which after installation completely encircle the legs 20 and 22 respectively. An intermediate portion 44 of the tubing 14 connects the opposite end portions 40 and 42 and extends along the inner periphery of the bridge section 24 of the body member when the tube is installed. In the tubing section 14 shown in FIGS. 1–3, a longitudinally extending wall portion is removed along the intermediate portion 44 to form a longitudinal opening defined by two longitudinally extending edges 46a and 46b and two notches 48a and 48b forming longitudinal end edges. The length of the longitudinal opening between the notches 48 is selected to be no less than, and preferably approximately equal to, the length of the bridging section 24 connecting the parallel legs 20 and 22 of the body member 12. Furthermore, the edges 46a, 46b lie in a longitudinally extending plane which is offset from the axis of the tubing 14 toward the side bearing the opening, and the greatest width of the longitudinal opening lies adjacent the longitudinal end edges, the longitudinal edges 46a, 46b being more closely spaced. By cutting the longitudinal opening so that the notches 48a, 48b adjacent the longitudinal ends of the opening are separated by an amount equal to the spacing of the legs and so that the notches penetrate approximately to the central plane of the tubing, the width of the opening will be largest at the longitudinal ends of the opening, such width being approximately equal to the inside diameter of the tubing. The tubing is then bent more easily into a U-shaped configuration corresponding to the shape of the body member 12, and the pointed tips 26 and 28 of the legs 20 and 22 are more easily inserted through the opening and into the end portions 40 and 42 of the tubing 14 as described in the installation operations below. The smaller width between the longitudinal edges 46a, 46b allows the intermediate portion 44 of the tubing to partially envelop the central portion or saddle 30 in the body member as shown most clearly in FIG. 2. By partially enveloping the saddle 30, there is less opportunity for a supported conduit to contact the metal of the bridging section 24 in installations where, for example, the cable is suspended in festoons or is otherwise bent over the bridge section 24. It is, therefore, advantageous to cut a wall portion from the tubing 14 so that the intermediate portion 44 has a circumferential dimension substantially greater than one half of the tube outer circumference and the circumferential dimensions adjacent the ends of the intermediate portion 44 are approximately equal to one half of the circumference. When installed, the tubing 14 provides insulation at the important regions of the body member 12, and the bridging section 24 and connecting ends of the legs 20 and 22 are exposed to the direct blows of a hammer when the staple is driven into a support.

The steps of the novel method for installing the sleeve or tubing section 14 on the U-shaped body member 12 in accordance with the present invention are depicted in sequence in FIGS. 4a–4e. In FIG. 4a a coil or roll 50 of non-metallic, flexible tubing (shown schematically) is unreeled from a supply spool to present a generally straight length of tubing L at the free or unraveled end of the coil. In FIG. 4b, a longitudinal wall portion 52 is cut from the generally straight length of tubing to form the longitudinal opening 54 and then the section 14 of tubing is severed from the coil 50. As shown, the removed wall portion has a greater circumferential dimension adjacent the longitudinal ends than at the midpoint to provide the desired opening for the installation steps which follow. With the wall portion 52 removed, the section of tubing 14 is bent in a generally U-shaped configuration corresponding to a U-shaped body member and with the longitudinal opening 54 at the outer periphery of the configuration as shown in FIG. 4c. A body member 12 is presented to the bent tubing 14 with the pointed tips 26 and 28 of the member adjacent the respective longitudinal ends of the opening 54. The pointed tips 26 and 28 of the legs 20 and 22 are aligned in a direction slightly out of the plane of the body member and it is preferable in preparation for the insertion of the leg tips through longitudinal opening in the tubing that the section of tubing be held at a slight angle relative to the plane of the body member 12 with the longitudinal axis of the tubing aligned with the pointed tips. In FIG. 4d, the pointed tips 26 and 28 of parallel legs 20 and 22 are inserted respectively into the opposite longitudinal ends of the opening 54 and through the respective axial end portions 40 and 42 of the tube 14 so that the end portions are located coaxially about the respective legs 20 and 22 of the body member and the opening 54 faces away from the pointed ends of the legs. In this respect, the term "insert" contemplates movements of the body member 12 and the tubing 14 relative to one another to position the legs 20 and 22 of the body member and the respective ends 40 and 42 of the tubing in coaxial relationship as shown, regardless of which element, the body member 12 or the tubing 14, is moved or held stationary. In FIG. 4e the tube 14 is driven or pressed into a fully seated position on the body member 12 so that the intermediate portion 44 is adjacent the bridging section 24 as also shown in FIGS. 1 and 2. Fully seating the intermediate portion 44 around the bridge section 24 may be carried out when a conduit captured by the staple is forced against the bridge section as the staple is driven into another object. Apparatus for performing the assembling operation as shown is disclosed in the copending application cross referenced above.

It will thus be seen that the insulated staple 10 is formed by adding a section of readily available plastic tubing to a metallic staple body member 12 known in the prior art. After cutting the longitudinal opening the tubing 14 is easily bent into a U-shaped configuration and is slipped onto the parallel legs 20 and 22 of the body member to provide the desired insulation at all important points of the staple without covering the upper portion of the body member which receives the driving blows of a hammer or other device directly. The length of the axial end portions 40 and 42 on the legs affects the depth of penetration of the legs into an object since the forces required to drive the legs further into an object after the end portions 40 and 42 have engaged the object increase significantly. Therefore, the end portions 40 and 42 afford some protection against crushing a captured conduit during a stapling operation. Additionally, it is significant that the steps for forming and installing the insulator are simple compared to the more sophisticated forming or molding operations taught in the prior art, and the insulated staples can be produced economically from ordinary plastic tubing or the like.

Although the present invention is described in a preferred embodiment, it will be readily understood that numerous modifications can be had without departing from the spirit of the invention. The body member 12 need not be an integrally formed element. The bridge section can be changed in shape and the saddle can be eliminated as desired. The particular form of the longitudinal opening can be varied from the form depicted in the drawings as long as the tubing installed on the body member provides the desired insulation and remains attached to the body member before and during use. The length of the axial end portions 40 and 42 of the tubing 14 and the length of the legs 20 and 22 of the body member 12 can be varied as desired. Materials other than those listed above can be employed provided that they can be made sufficiently flexible for installation of the body member. Accordingly, the present invention is disclosed in a preferred embodiment by way of illustration rather than limitation.

We claim:
1. A method of making an insulated staple comprising the steps of: providing a U-shaped body member having two spaced and generally parallel legs and a bridging section connected to one end of each leg opposite the spaced, free ends of the legs; providing a flexible tube formed from an insulating material and having a length between the axial ends of the tube less than the combined lengths of the two parallel legs and the bridging section of the body member, and greater than the length of the bridging section alone; removing a longitudinally extending wall portion of the tube to form a longitudinal opening along one side of the tube intermediate the axial tube ends, the longitudinal length of the removed wall portion and the opening being less than the length of the tube; and after removing the wall portion, installing the flexible tube on the U-shaped body member in a position locating the axial ends of the tube coaxially on the respective legs of the body member and locating the longitudinal opening of the tube facing away from the free ends of the legs.

2. A method of making an insulated staple as defined in claim 1 wherein the step of removing comprises removing the wall portion to form a longitudinal opening having a length along the axis of the tube substantially equal to the length of the bridging section alone.

3. A method as defined in claim 2 wherein the step of installing comprises bending the flexible tube in a U-shaped configuration, and inserting the spaced ends of the legs through the longitudinal opening into the tube and respectively out of the axial ends of the tube.

4. A method of making an insulated staple as defined in claim 2 wherein the step of installing comprises installing the tube in a position on the body member in which the portion of the tube coextensive with the longitudinal opening partially envelops the bridging section of the body member.

5. A method of making an insulated staple as defined in claim 1 wherein the step of removing comprises cutting the wall portion to form a longitudinal opening having a longitudinal length substantially equal to the length of the bridging section of the body member and having a width adjacent the longitudinal ends of the opening greater than the width at the longitudinal midpoint of the opening.

6. A method of making an insulated staple as defined in claim 5 wherein the step of cutting comprises cutting the opening to provide the greatest width of the opening adjacent the longitudinal ends and equal to the inside diameter of the tube.

7. A method of making as defined in claim 1 wherein the step of removing comprises cutting from the tube a wall portion having a circumferential dimension adjacent the longitudinal ends of the wall portion greater than the circumferential dimension at the midpoint of the wall portion.

8. A method of making an insulated staple as defined in claim 1 wherein the step of providing a flexible tube comprises selecting a plastic tube having an internal diameter corresponding to the diametrical dimension of the leg of the body member.

9. A method of installing a generally straight, flexible, insulating sleeve on a U-shaped staple having a bridging section integrally connected to two spaced and parallel legs comprising the steps of: removing a longitudinal wall portion from one side of the insulating sleeve intermediate the axial ends of the sleeve to form a longitudinal opening while the sleeve is held in a generally straight configuration, the longitudinal dimension of the removed wall portion and the opening being selected to correspond with the spacing of the parallel legs at the connections with bridging section of the U-shaped staple; bending the flexible insulating sleeve along the region of the sleeve previously containing the removed wall portion to form a U-shaped configuration in which the longitudinal opening is located along the outer periphery of the bent sleeve; and inserting the free ends of the spaced and parallel legs respectively into the opposite ends of the longitudinal openings and through the respective axial ends of the flexible sleeve.

10. A method of installing a flexible insulating sleeve on a U-shaped staple as defined in claim 9 wherein the step of removing comprises removing a wall portion having circumferential dimensions adjacent the longitudinal ends of the wall portion greater than the circumferential dimension at a point midway between the longitudinal ends of the wall portion.

11. A method of installing a flexible insulating sleeve as defined in claim 10 wherein the step of removing comprises cutting from the sleeve a wall portion having a circumferential dimension at the midpoint of the longitudinal dimension less than one half of the outer circumference of the sleeve.

12. The method of making an insulated staple comprising the steps of:
providing a U-shaped body member having two spaced and generally parallel legs and a bridging section connected to one end of each leg opposite the spaced, free ends of the legs;
providing a flexible tube formed from an insulating material and having a length between the two opposite axial ends of the tube less than the combined lengths of the two parallel legs and the bridging section of the body member, and greater than the length of the bridging section alone, the tube having internal cross sectional dimensions corresponding approximately with the cross sectional dimensions of the legs of the body member; and
mounting the flexible tube on the U-shaped body member with the two axial end portions of the tube located coaxially on the two legs of the body member respectively with the tube walls of the axial end portions completely circumscribing the respective legs in close fitting relationship and with the remaining portion of the tube between the axial end portions extending under the bridging section of the body member.

13. The method of making an insulated staple as defined in claim 12 including the step of driving the flexible tube onto the body member to a position in which the remaining portion of the tube between the axial end portions is seated against the bridging section of the body member.

14. The method of making an insulated staple as defined in claim 16 including the step of:
bending the flexible tube into a U-shaped configuration prior to the step of inserting.

15. The method of claim 14 wherein:
the step of bending comprises bending the flexible tube into a U-shaped configuration having the axial end portions substantially parallel with one another and spaced by a distance equal to the spacing of the legs on the body member.

16. The method of making an insulated staple as defined in claim 12 wherein:
the step of mounting includes inserting the tips of the spaced, free ends of the two legs respectively into the interior of the flexible tube adjacent the opposite axial ends and then out through the opposite ends so that the axial end portions of the tube are located coaxially and respectively on the legs.

* * * * *